(No Model.)
G. D. CARMER.
COMBINED SEEDER AND HARROW.
No. 369,395. Patented Sept. 6, 1887.
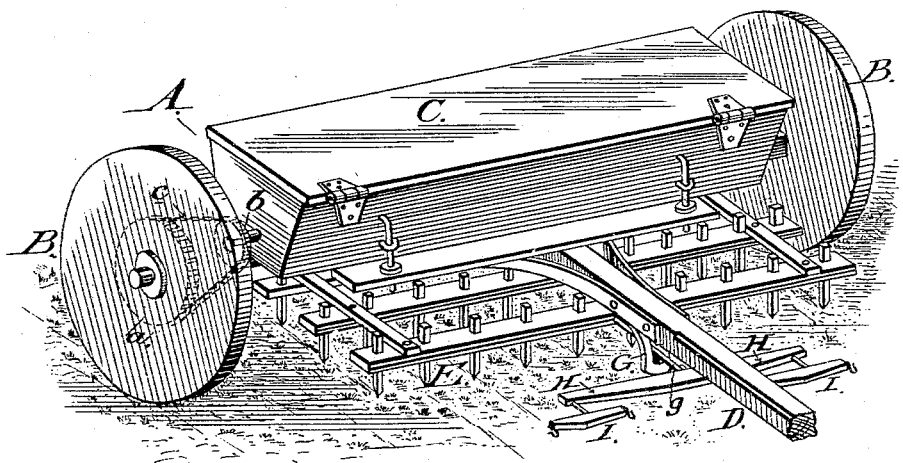
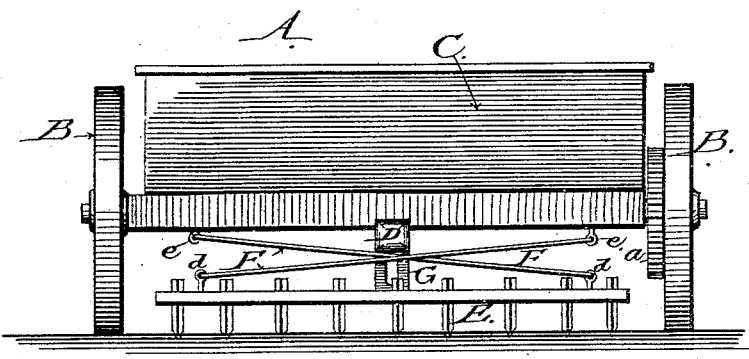
Witnesses
T. W. Fowler
W. H. Patterson
Inventor
Grant D. Carmer,
By his Attorneys
A. H. Evans & Co.

UNITED STATES PATENT OFFICE.

GRANT D. CARMER, OF ODEBOLT, IOWA.

COMBINED SEEDER AND HARROW.

SPECIFICATION forming part of Letters Patent No. 369,395, dated September 6, 1887.

Application filed July 9, 1887. Serial No. 243,832. (No model.)

*To all whom it may concern:*

Be it known that I, GRANT D. CARMER, a citizen of the United States, residing at Odebolt, in the county of Sac and State of Iowa, have invented certain new and useful Improvements in Combined Seeders and Harrows, of which the following is a full and clear description, reference being had to the accompanying drawings, forming part of this specification, in which—

Figure 1 represents a perspective view of a combined seeder and harrow embodying my invention. Fig. 2 is a rear view of the same.

My invention relates to combined seeders and harrows; and it consists in the peculiar construction and combination of devices, which I shall hereinafter fully describe and claim.

To enable others skilled in the art to which my invention appertains to make and use the same, I will now describe its construction and indicate the manner in which the same is carried out.

In the said drawings, A represents a seeder of any well-known construction, having the usual supporting-wheels, B, seed-box C, and tongue or pole D, the seeding appliances being operated by power derived from the supporting-wheels through the medium of the sprocket-wheels $a$ and $b$ and drive-chain $c$, the wheels $a$ being fixed to one of the supporting-wheels and the wheels $b$ keyed to a shaft passing transversely through the seed-box, as shown.

A harrow, E, or other cultivating device is suspended beneath and within the limits of the seeder-frame by means of links F, which are secured in eyes $d$ on one of the rear beams of the harrow, and thence extend diagonally upward, crossing each other, and having their other or upper ends secured in eyes $e$ on the under side of the main axle, as shown in Fig. 2. By reason of this loose connection the harrow is permitted to conform to the irregularities of the land without throwing any strain upon the seeder-frame.

From the under side of the pole or tongue depends a slotted arm or plate, G, which supports the front end of the harrow, the front beam of which is provided with a rod, $g$, which extends through the slot in the plate G, and is coupled or attached to a doubletree, H, carrying the usual singletrees, I. By thus locating the double and single trees on a line with the harrow-beams, I am enabled to secure a much lighter and direct draft than can be secured by locating the draft appliances at any other point.

Having thus described my invention, what I claim as new, and desire to secure by Letters Patent, is—

A seeding-machine, in combination with a harrow beneath and within its frame, the diagonally-arranged links for supporting the rear end of said harrow, a slotted plate supporting the front of the same, and draft appliances connected with the front of said harrow, substantially as herein described.

GRANT D. CARMER.

Witnesses:
O. N. BAGWILL,
Z. BAGWILL.